3,177,276
METHOD FOR PREPARATION OF EMBOSSED THERMOPLASTIC SHEET AND COMPOSITION FOR PRODUCING SAME
Robert Doyle and Paul J. Boeke, Bartlesville, Okla., assignors to Phillips Petroleum Company, a corporation of Delaware
No Drawing. Filed June 6, 1958, Ser. No. 740,184
11 Claims. (Cl. 264—176)

This invention relates to embossed thermoplastic sheet having an irregular surface of random design, and method for producing said sheet. In one aspect the invention relates to embossed sheet prepared from normally solid polymers of 1-olefin. In another aspect this invention relates to method for preparing embossed thermoplastic sheet by extruding said sheet in the presence of water and water-dispersing material.

As used herein the term "embossed" means broadly "a raised surface," i.e., a surface which extends, at points, above the normal surface level of the thermoplastic sheet.

It is well known that it is necessary to remove substantially all of the water or volatile materials from thermoplastic materials when these materials are utilized in molding and extrusion processes. If moisture is present in the molding material the surface of the molded article or extruded form often contains imperfections and there may also be internal voids or trapped water within the article. Such imperfections are undesirable in a product that is marketed, not only because of appearance but also due to the fact that these imperfections may provide weak spots in the article, thereby making the article more susceptible to failure and cracking.

Normal methods for embossing a thermoplastic material in the form of an extruded sheet are generally very costly and time consuming. When an extruded sheet is to be embossed it is necessary to have a very expensive engraved roll which is used to modify the surface of the sheet, either while the thermoplastic material is relatively soft, for example, directly after the extrusion die, or in a subsequent procedure wherein the sheet is reheated and thereafter contacting with the engraved roll to provide an embossed surface. It is readily apparent that the cost of the engraved embossing roll and the labor involved in the embossing operation substantially increase the expense required for the preparation of embossed sheet.

It is an object of this invention to provide improved embossed thermoplastic sheet having an irregular surface of random design.

Another object of the invention is to provide an improved method for the preparation of embossed thermoplastic sheet.

Still another object of the invention is to provide embossed thermoplastic sheet of normally solid polymers of 1-olefins, said sheet having an irregular surface of random design.

Yet another object of the invention is to provide improved embossed polyethylene sheet.

Still another object of the invention is to provide an improved process for the preparation of embossed polyethylene sheet.

These and other objects of the invention will become more readily apparent from the following detailed description and discussion.

The foregoing objects are achieved broadly by extruding in sheet form a thermoplastic material containing admixed therein water and a water-dispersing material.

In one aspect of the invention a thermoplastic material, water and a water-dispersing material are admixed, introduced to an extruder, heated to a temperature above the softening temperature of the thermoplastic and extruded in the form of a sheet.

In another aspect of the invention a hygroscopic pigment is utilized as the water-dispersing material to provide both dispersion of the water and coloring of the embossed sheet.

The embossed sheet prepared by the method of this invention is characterized by its irregular surface of random design, and by being substantially free from visible voids or pockets of air or water. The surface of the sheet has a texture-like appearance which can vary in depth from 1/64 of an inch or less to as much as 1/8 of an inch. The ordinary embossed sheet which is prepared with an embossing roll has a repeating pattern. Thus, whatever design is pressed on the roller is repeated with each revolution of the roll. The applicants' sheet, however, has a pattern which is irregular and completely random in design. No discernible pattern repetition occurs other than the general texture effect of the embossing.

In the preparation of the embossed sheet the thermoplastic material, such as polyethylene, a water-dispersing material, and a controlled amount of water are admixed prior to extrusion of the sheet. The mixing can be provided in a Banbury or other type of plasticizing machine or in the sheet extrusion apparatus, so as to provide a uniform distribution of the water-dispersing material and water throughout the thermoplastic. The blend is thereafter extruded in the form of the sheet, the dimensions of which are controlled only by the capacity of the particular extruder used. Within the extruder the blend of thermoplastic, water and water-dispersing material is heated to a temperature in the order usually of from about 50 to about 250° F. above the softening temperature of the thermoplastic. The resulting free flowing molten polymer mass is then extruded in the form of a sheet. As the polymeric material issues from the extruder die vaporized water is released from the surface thereof providing an irregular, random embossed surface on the sheet. Thereafter the sheet is passed in contact with one or more highly polished rolls which provide means for handling the sheet and also act to compress the highest points of the embossed surface.

The embossing effect obtained can be varied depending on the amount of water employed in the extrusion of the embossed sheet. The quantity of water which can be used varies over a wide range, from as low as 0.1 weight percent to as high as 10 weight percent, preferably from about 1 to about 5 weight percent. As stated the temperature in the extrusion operation is usually in the order of from 50 to 250° F. above the softening point of the thermoplastic material. It is, of course, necessary that the temperature be above the boiling point of water at the conditions prevailing in the extruder. The extrusion pressure can vary over a wide range from as low as 50 p.s.i. to as high as several thousand pounds. The pressure employed is not critical and only sufficient pressure is used to provide the type, size and thickness of sheet design which is desired.

It is the function of the water-dispersing material to adsorb or otherwise retain the water whereby the water can be distributed throughout the thermoplastic. In general, any of the conventional hygroscopic materials which are stable at the extrusion temperatures can be utilized for this purpose. Examples of hygroscopic agents include materials such as carbon black, silica gel, ammonium ferric sulfate, calcium chromate, calcium (d-l) tartrate, magnesium bromate, magnesium sulfite, potassium sodium tartrate, and the like. The quantity of water-dispersing material employed is, in general, dictated by the amount of water present in the blend to be extruded. It is necessary that sufficient water-dispersing material be present to effectively distribute the water throughout the blend. The broad range of water-dispersing material which can be employed varies from as low as 0.1 to as high as 10 weight percent, however, preferably the amount used is between about 1 and about 4 weight percent. In addition to the water-dispersing material other materials can also be added to or can be present in the thermoplastic. If it is desired to produce articles of various colors, pigments can be incorporated in the thermoplastic. In some instances the pigments have hygroscopic properties which reduces the quantity of water-dispersing material required. For example, if carbon black is used this material is sufficiently hygroscopic that it can be employed both as a coloring pigment and as the water-dispersing agent. Other materials, such as, anti-oxidants can also be incorporated in the blend before extrusion.

The thermoplastic materials which can be used to prepare the embossed sheets of this invention include, in general, non-hygroscopic thermoplastic materials, i.e., thermoplastic materials which do not inherently retain and disperse water present therein. Suitable starting materials include medium, low and high density polymers of olefins; polystyrene polymers and copolymers; high impact styrenes, which are mixtures of polystyrenes with rubbers, or copolymers of polystyrenes; acrylics, such as, acrylates, and methacrylates, including, for example, methylacrylate, ethylacrylate, methylmethacrylate, ethylmethacrylate, etc., and the like. It is to be understood that the foregoing are merely illustrative of the thermoplastics which can be used in carrying out the invention.

The invention finds particular use in the preparation of embossed sheets of olefin polymers, such as, for example, polymers or copolymer of monoolefins, like ethylene and propylene, butylene, etc., also copolymers of monoolefins and diolefins, such as, butadiene, isoprene, etc. The invention is particularly applicable to polymers of 1-olefins having a maximum of 8 carbon atoms per molecule and no branching nearer the double bond than the 4 positions, and more particularly to polymers of ethylene which have a specific gravity of at least 0.94 at 20° C. and preferably 0.96 or higher and a crystallinity of at least 70 percent and preferably at least 80 percent at ordinary room temperatures.

A preferred olefin polymerization method is described in detail in Hogan et al., U.S. Patent No. 2,825,721, issued March 4, 1958. This particular method utilizes a chromium oxide catalyst, containing hexavalent chromium associated with silica, alumina, silica-alumina, zirconia, thoria, etc. In one embodiment of this patent, olefins are polymerized in the presence of a hydrocarbon diluent, for example, an acyclic, alicyclic or, less preferably, aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either transinternal or terminal vinyl, depending on the particular process conditions employed. When low reaction temperatures, about 150° F. to about 320° F. and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystallinity at normal atmospheric temperatures.

Other less advantageous procedures which employed different catalysts are also used for preparing olefin polymers. For example, polymers are prepared in the presence of organometallic compounds such as triethylaluminum plus titanium tetrachloride, mixtures of ethyl aluminum halides with titanium tetrachloride, and the like. Another group of catalysts which is used comprises a halide of a Group IV metal such as, for example, titanium tetrachloride, zirconium tetrachloride, etc., with one or more free metals selected from the group consisting of sodium, potassium, lithium, rubidium, zinc, cadmium and aluminum.

In addition to polymers prepared by the foregoing methods polyethylene and other olefin polymers prepared by the conventional high pressure methods can also be employed in carrying out the invention.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent-to-olefin ratio, etc.

The polymerization pressure is usually maintained at a sufficient level to assure a liquid phase reaction, that is at least about 100 to 300 p.s.i.g., depending upon the type of feed material and the polymerization temperature. Higher pressures up to 500 to 700 p.s.i.g. or higher can be used, if desired. If it is desired to carry out the process in the vapor state much lower pressures, down to atmospheric, can be employed. When utilizing a fixed bed the space velocity varies from as low as about 0.1 to about 20 volumes of feed per volume of catalyst, with the preferred range being between about 1 and about 6 volumes per volume per hour. When operating with a mobile catalyst it is desirable to maintain the catalyst concentration in the reaction zone between about 0.01 and about 10 percent by weight. Residence time can be from 10 minutes or less to 10 hours or more.

The use of a diluent in the polymerization reaction in general serves two purposes. Since the reactions are usually exothermic in nature, the presence of a quantity of diluent provides a method for obtaining close control of the reaction temperature. In addition, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually the olefin constitutes between about 0.1 and about 25 percent by volume of the mixture and preferably between about 2 and about 15 percent by volume.

The solvent or diluent employed in the polymerization reaction includes, in general, paraffin hydrocarbons. Among the more useful solvents are paraffins having between about 3 and about 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, such as cyclohexane, methylcyclohexane, etc. Aromatic diluents are not normally used because they (or impurities therein) tend to shorten the catalyst life; however, if catalyst life is not an important factor in the process, solvents of an aromatic nature can also be employed. All of the foregoing and in addition, other hydrocarbon diluents which are relatively inert, non-deleterious, and in the liquid state at the reaction conditions can also be employed in carrying out the reaction of olefins to form solid polymers.

The embossed sheet of this invention is useful in many applications, such as, wall or ceiling covering material, tile, room dividers or movable partitions, trim (inside or outside), display devices, etc. The embossed sheet can also be vacuum formed into useful articles such as luggage, dishes, bowls, ornamental pieces, etc.

The following examples are presented in illustration of one embodiment of the invention.

Example I

Polyethylene was prepared in the presence of a chromium oxide catalyst, having a composition of about 2.5 weight percent chromium, containing hexavalent chromium, associated with silica-alumina, prepared by impregnating silica-alumina with chromium trioxide solution, followed by drying and activation for several hours at 950° F.

The operating conditions employed in the production of the polymer were as follows:

| | |
|---|---|
| Temperature ° F | 290–300 |
| Pressure p.s.i.g | 420 |
| Polymer concentration in reactor* wt. percent | 4.5 |
| Catalyst concentration in reactor* do | 0.02 |

The polyethylene product had a melt index of 1.04. 0.1 weight percent of Santowhite crystals (dialkylphenosulfide used as antioxidant) and 3.0 weight percent colloidal channel carbon black were added to the polyethylene by hot milling until a uniform dispersion was obtained. The dispersion which contained 3±½ weight percent water was extruded in the form of a sheet 100 mils thick. The sheet was contacted on one side with a roll to assist in removal from the extruder. The conditions employed were as follows:

| | |
|---|---|
| Extruder cylinder temperature ° F | 540 |
| Extruder die temperature ° F | 550 |
| Polish roll: | |
| Bottom | 220 |
| Middle | 220 |
| Top | 220 |
| Line speed ft./in | 0.82 |

The sheet so produced (sample A) had a highly decorative embossed surface which was irregular and of random design.

Example II

Another sample of polyethylene was prepared under conditions similar to those employed in Example I, except that the polymerization temperature employed was about 280° F. The product had a melt index of about 0.2. This material was divided into two parts and extruded in the form of sheets under the following conditions:

COMPOSITION OF SAMPLES

| | Sample B | Sample C |
|---|---|---|
| Santowhite, weight percent | 0.10 | 0.10 |
| Carbon black, weight percent | 2.5 | 0 |
| Water, weight percent | 3.0±½ | 0.5 |

EXTRUDER CONDITIONS

| | Sample B | Sample C |
|---|---|---|
| Extruder cylinder Temp., ° F | 440 | 440 |
| Extruder Die Temp., ° F | 440 | 440 |
| Polish Roll, ° F.: | | |
| Bottom | 230 | 230 |
| Middle | 240 | 240 |
| Top | 210 | 210 |
| Line speed, inches/Min | 10 | 10 |
| Thickness of sheet, mils | 60 | 100 |

Sample B was similar in appearance to Sample A. Sample C, in which no carbon black was present, contained a large number of voids and bubbles and was generally unattractive in appearance.

Having thus described the invention by providing specific examples thereof, it is to be understood that no undue limitations or restrictions are to be drawn by reason thereof and that many varitions and modifications are within the scope of the invention.

We claim:

1. A method for preparation of embossed extruded solid sheet of nonhygroscopic thermoplastic material which comprises uniformly dispersing in said material prior to extrusion water and a water dispersing material selected from the group consisting of carbon black, silica gel, ammonium ferric sulfate, calcium chromate, calcium (d–l) tartrate, magnesium bromate, magnesium sulfite and potassium sodium tartrate, elevating the temperature of the admixture above the boiling point of water at the conditions prevailing in the extrusion zone and above the softening point of the thermoplastic material and extruding the dispersion.

2. The method of claim 1 in which the quantity of water is between about 0.1 and about 10 weight percent and the quantity of water dispersing material is between about 0.1 and about 10 weight percent.

3. The method of claim 1 wherein said nonhygroscopic thermoplastic material is a polymer of an olefin.

4. The method of claim 1 wherein said nonhygroscopic thermoplastic material is a polymer of ethylene.

5. A method for the preparation of embossed extruded solid polyethylene sheet which comprises uniformly dispersing in said polyethylene prior to extrusion water and a water dispersing material selected from the group consisting of carbon black, silica gel, ammonium ferric sulfate, calcium chromate, calcium (d–l) tartrate, magnesium bromate, magnesium sulfite and potassium sodium tartrate, elevating the temperature of the admixture above the boiling point of water at the conditions prevailing in the extrusion zone and above the softening point of the polyethylene and extruding the dispersion.

6. The method of claim 1 in which the quantity of water is between about 0.1 and about 10 weight percent and the quantity of water dispersing material between about 0.1 and about 10 weight percent.

7. The method of claim 6 in which the water dispersing material is carbon black.

8. A method for the preparation of embossed extruded solid polyethylene sheet which comprises uniformly admixing polyethylene with between about 0.1 and 10 weight percent water and about 0.1 and 10 weight percent carbon black, introducing the admixture to an extruder, elevating the temperature of the admixture above the softening point of the polyethylene and above the boiling point of water at the conditions prevailing in said extruder and extruding the admixture in the form of a sheet.

9. A mixture suitable for the formation of embossed solid sheet by extrusion at a temperature above the boiling point of water at the conditions prevailing in the extrusion zone and above the softening point of the hereinafter described thermoplastic comprising a uniform mixture of a non-hygroscopic thermoplastic material, water, pigment and a solid hygroscopic material selected from the group consisting of carbon black, silica gel, ammonium ferric sulfate, calcium chomate, calcium (d–l) tartrate, magnesium bromate, magnesium sulfite and potassium sodium tartrate, said hygroscopic material being distinct from said pigment and capable of absorbing said water.

10. The mixture of claim 9 in which the water is present in an amount between about 0.1 and about 10 weight percent and the solid hygroscopic material is present in the amount between about 0.1 and about 10 percent.

11. The mixture of claim 9 wherein said thermoplastic comprises polyethylene.

References Cited by the Examiner

UNITED STATES PATENTS

| | | | |
|---|---|---|---|
| 2,167,514 | 7/39 | Jones et al. | 106—288 |
| 2,336,944 | 12/43 | Madge et al. | 18—535 |
| 2,442,598 | 6/48 | Harrison | 18—56 |
| 2,446,771 | 8/48 | Knowland | 18—56 |
| 2,482,094 | 9/49 | Chavannes et al. | 18—57 |
| 2,504,780 | 4/50 | Young | 18—56 |
| 2,512,459 | 6/50 | Hamilton | 260—41 |
| 2,528,200 | 10/50 | Weinberg | 18—48 |
| 2,536,048 | 1/51 | Flanagan | 18—61 |
| 2,692,245 | 10/54 | Groves | 260—59.6 |
| 2,700,655 | 1/55 | Endres | 260—41.5 |
| 2,772,322 | 11/56 | Witt et al. | 18—48 |
| 2,798,258 | 7/57 | Allan et al. | 18—57 |
| 2,888,424 | 5/59 | Precopio et al. | 260—41.5 |
| 2,904,844 | 9/59 | Smithies | 260—29.6 |
| 2,909,810 | 10/59 | Jensch | 260—29.6 |
| 2,972,780 | 2/61 | Boonstra | 18—55 |
| 3,066,356 | 12/62 | Porter | 18—15 |

WILLIAM H. SHORT, *Primary Examiner.*

D. ARNOLD, LEON J. BERCOVITZ, *Examiners.*